United States Patent
Miyake et al.

(10) Patent No.: US 7,273,655 B2
(45) Date of Patent: *Sep. 25, 2007

(54) SLIDABLY MOVABLE MEMBER AND METHOD OF PRODUCING SAME

(75) Inventors: Shojiro Miyake, 3-1-38, Gonokami, Hamura-shi, Tokyo (JP) 205-0011; Yoshiteru Yasuda, Yokohama (JP); Makoto Kano, Yokohama (JP); Yutaka Mabuchi, Kanagawa (JP)

(73) Assignees: Shojiro Miyake, Tokyo (JP); Nissan Motor Co., Ltd., Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/033,176

(22) Filed: Jan. 12, 2005

(65) Prior Publication Data

US 2005/0118426 A1    Jun. 2, 2005

Related U.S. Application Data

(63) Continuation of application No. 09/545,181, filed on Apr. 7, 2000, now Pat. No. 6,844,068.

(30) Foreign Application Priority Data

Apr. 9, 1999    (JP) ................................ 11-102205

(51) Int. Cl.
*F16N 15/02*    (2006.01)

(52) U.S. Cl. ................. 428/408; 280/86.753; 292/137; 403/135; 204/192.1; 204/192.16; 427/249.1; 427/249.7; 427/577; 428/141; 428/174; 428/698

(58) Field of Classification Search ................ 428/408, 428/141, 142, 174, 698; 292/137; 403/135; 280/86.753; 427/577, 249.1, 249.7; 204/192.1, 204/192.16

See application file for complete search history.

(56) References Cited

U.S. PATENT DOCUMENTS 1,461 A    12/1839    Day (Continued)

FOREIGN PATENT DOCUMENTS

CA    2009582    8/1990

(Continued)

OTHER PUBLICATIONS

Database WPI, Nov. 28, 2000, Derwent Publications, Ltd., AN 2000640583, XP002240184, JP 2000-327484.

(Continued)

*Primary Examiner*—Archene Turner
(74) *Attorney, Agent, or Firm*—Foley & Lardner LLP (57) ABSTRACT

A slidably movable member such as an adjusting shim used in a valve operating mechanism of an internal combustion engine of an automotive vehicle. The slidably movable member is used in contact with lubricating oil and comprises a substrate. A hard carbon-based film is coated on a surface of the substrate. The hard carbon-based film has a surface section which contains at least one of nitrogen and oxygen in an amount ranging from 0.5 to 30 at % and/or hydrogen in an amount of not more than 10 at %.

9 Claims, 3 Drawing Sheets

U.S. PATENT DOCUMENTS

| | | |
|---|---|---|
| 2,716,972 A | 9/1955 | Farny et al. |
| 2,982,733 A | 5/1961 | Wright et al. |
| 3,211,647 A | 10/1965 | O'Halloran et al. |
| 3,790,315 A | 2/1974 | Emanuelsson et al. |
| 3,846,162 A | 11/1974 | Bloom |
| 3,932,228 A | 1/1976 | Sugiyama et al. |
| 4,367,130 A | 1/1983 | Lemelson |
| 4,385,880 A | 5/1983 | Lemelson |
| 4,538,929 A | 9/1985 | Ehrentraut et al. |
| 4,554,208 A | 11/1985 | MacIver et al. |
| 4,645,610 A | 2/1987 | Born et al. |
| 4,702,808 A | 10/1987 | Lemelson |
| 4,712,982 A | 12/1987 | Inagaki et al. |
| 4,755,237 A | 7/1988 | Lemelson |
| 4,755,426 A | 7/1988 | Kokai et al. |
| 4,783,368 A | 11/1988 | Yamamoto |
| 4,834,400 A | 5/1989 | Lebeck |
| 4,842,755 A | 6/1989 | Dunn |
| 4,859,493 A | 8/1989 | Lemelson |
| 4,874,596 A | 10/1989 | Lemelson |
| 4,919,974 A | 4/1990 | McCune et al. |
| 4,933,058 A | 6/1990 | Bache et al. |
| 4,943,345 A | 7/1990 | Asmussen et al. |
| 4,960,643 A | 10/1990 | Lemelson |
| 4,974,498 A | 12/1990 | Lemelson |
| 4,980,021 A | 12/1990 | Kitamura et al. |
| 4,980,610 A | 12/1990 | Varga |
| 4,981,717 A | 1/1991 | Thaler |
| 4,988,421 A | 1/1991 | Drawl et al. |
| 4,992,082 A | 2/1991 | Drawl et al. |
| 5,000,541 A | 3/1991 | DiMarcello et al. |
| 5,021,628 A | 6/1991 | Lemelson |
| 5,032,243 A | 7/1991 | Bache et al. |
| 5,036,211 A | 7/1991 | Scott |
| 5,040,501 A | 8/1991 | Lemelson |
| 5,067,826 A | 11/1991 | Lemelson |
| 5,077,990 A | 1/1992 | Plath |
| 5,078,848 A | 1/1992 | Anttila et al. |
| 5,087,608 A | 2/1992 | Chan et al. |
| 5,096,352 A | 3/1992 | Lemelson |
| 5,110,435 A | 5/1992 | Haberland |
| 5,112,025 A | 5/1992 | Nakayama et al. |
| 5,127,314 A | 7/1992 | Swain |
| 5,131,941 A | 7/1992 | Lemelson |
| 5,132,587 A | 7/1992 | Lemelson |
| 5,142,785 A | 9/1992 | Grewal et al. |
| 5,143,634 A | 9/1992 | Quinga et al. |
| 5,148,780 A | 9/1992 | Urano et al. |
| 5,187,021 A | 2/1993 | Vydra et al. |
| 5,190,807 A | 3/1993 | Kimock et al. |
| 5,190,824 A | 3/1993 | Itoh |
| 5,202,156 A | 4/1993 | Yamamoto et al. |
| 5,205,188 A | 4/1993 | Repenning et al. |
| 5,205,305 A | 4/1993 | Yamakita |
| H1210 H | 7/1993 | Jansen |
| 5,232,568 A | 8/1993 | Parent et al. |
| 5,237,967 A | 8/1993 | Willermet et al. |
| 5,249,554 A | 10/1993 | Tamor et al. |
| 5,255,783 A | 10/1993 | Goodman et al. |
| 5,255,929 A | 10/1993 | Lemelson |
| 5,284,394 A | 2/1994 | Lemelson |
| 5,288,556 A | 2/1994 | Lemelson |
| 5,295,305 A | 3/1994 | Hahn et al. |
| 5,299,937 A | 4/1994 | Gow |
| 5,317,938 A | 6/1994 | de Juan, Jr. et al. |
| 5,326,488 A | 7/1994 | Minokami et al. |
| 5,332,348 A | 7/1994 | Lemelson |
| 5,334,306 A | 8/1994 | Dautremont-Smith et al. |
| 5,349,265 A | 9/1994 | Lemelson |
| 5,358,402 A | 10/1994 | Reed et al. |
| 5,359,170 A | 10/1994 | Chen et al. |
| 5,360,227 A | 11/1994 | Lemelson |
| 5,380,196 A | 1/1995 | Kelly et al. |
| 5,401,543 A | 3/1995 | O'Neill et al. |
| H1461 H | 7/1995 | DiVita et al. |
| 5,432,539 A | 7/1995 | Anderson |
| 5,433,977 A | 7/1995 | Sarin et al. |
| H1471 H | 8/1995 | Braun et al. |
| 5,443,032 A | 8/1995 | Vichr et al. |
| 5,447,208 A | 9/1995 | Lund et al. |
| 5,456,406 A | 10/1995 | Lemelson |
| 5,458,754 A | 10/1995 | Sathrum et al. |
| 5,461,648 A | 10/1995 | Nauflett et al. |
| 5,462,772 A | 10/1995 | Lemelson |
| 5,464,667 A | 11/1995 | Köhler et al. |
| 5,466,431 A | 11/1995 | Dorfman et al. |
| 5,479,069 A | 12/1995 | Winsor |
| 5,482,602 A | 1/1996 | Cooper et al. |
| 5,491,028 A | 2/1996 | Sarin et al. |
| 5,497,550 A | 3/1996 | Trotta et al. |
| 5,509,841 A | 4/1996 | Winsor |
| 5,516,729 A | 5/1996 | Dawson et al. |
| 5,529,815 A | 6/1996 | Lemelson |
| 5,531,878 A | 7/1996 | Vadgama et al. |
| 5,541,566 A | 7/1996 | Deeney |
| 5,547,716 A | 8/1996 | Thaler |
| 5,551,959 A | 9/1996 | Martin et al. |
| 5,552,675 A | 9/1996 | Lemelson |
| 5,568,391 A | 10/1996 | Mckee |
| 5,593,719 A | 1/1997 | Dearnaley et al. |
| 5,616,372 A | 4/1997 | Conley et al. |
| 5,619,889 A | 4/1997 | Jones et al. |
| 5,628,881 A | 5/1997 | Lemelson |
| 5,630,275 A | 5/1997 | Wexler |
| 5,630,953 A | 5/1997 | Klink |
| 5,653,300 A | 8/1997 | Lund et al. |
| 5,669,144 A | 9/1997 | Hahn et al. |
| 5,672,054 A | 9/1997 | Cooper et al. |
| 5,688,557 A | 11/1997 | Lemelson et al. |
| 5,707,409 A | 1/1998 | Martin et al. |
| 5,714,202 A | 2/1998 | Lemelson et al. |
| 5,719,109 A | 2/1998 | Tokashiki et al. |
| 5,723,207 A | 3/1998 | Lettington et al. |
| 5,731,046 A | 3/1998 | Mistry et al. |
| 5,735,769 A | 4/1998 | Takemura et al. |
| 5,740,941 A | 4/1998 | Lemelson |
| 5,775,817 A | 7/1998 | Gottemoller et al. |
| 5,786,038 A | 7/1998 | Conley et al. |
| 5,790,146 A | 8/1998 | Anderson |
| 5,793,390 A | 8/1998 | Claflin et al. |
| 5,794,801 A | 8/1998 | Lemelson |
| 5,799,549 A | 9/1998 | Decker et al. |
| 5,806,557 A | 9/1998 | Helge |
| 5,824,387 A | 10/1998 | Boutaghou et al. |
| 5,834,708 A | 11/1998 | Svetal et al. |
| 5,840,662 A | 11/1998 | Nibert et al. |
| 5,843,571 A | 12/1998 | Sho |
| 5,851,962 A | 12/1998 | Kaga |
| 5,866,195 A | 2/1999 | Lemelson |
| 5,871,805 A | 2/1999 | Lemelson |
| 5,881,444 A | 3/1999 | Schaefer et al. |
| 5,901,021 A | 5/1999 | Hirano et al. |
| 5,910,940 A | 6/1999 | Guerra |
| 5,927,897 A | 7/1999 | Attar |
| 5,937,812 A | 8/1999 | Reedy et al. |
| 5,940,975 A | 8/1999 | Decker et al. |
| 5,945,214 A | 8/1999 | Ma et al. |
| 5,947,710 A | 9/1999 | Cooper et al. |
| 5,952,102 A | 9/1999 | Cutler |
| 5,958,261 A | 9/1999 | Offer et al. |
| 5,960,762 A | 10/1999 | Imai |
| 5,967,250 A | 10/1999 | Lund et al. |
| 5,968,596 A | 10/1999 | Ma et al. |
| 5,975,686 A | 11/1999 | Hauck et al. |

| Patent No. | Date | Inventor |
|---|---|---|
| 5,976,707 A | 11/1999 | Grab |
| 5,992,268 A | 11/1999 | Decker et al. |
| 5,993,938 A | 11/1999 | Tsukuda et al. |
| 6,006,415 A | 12/1999 | Schaefer et al. |
| 6,015,597 A | 1/2000 | David |
| 6,016,000 A | 1/2000 | Moslehi |
| 6,023,979 A | 2/2000 | Bills et al. |
| 6,028,393 A | 2/2000 | Izu et al. |
| 6,051,298 A | 4/2000 | Ko et al. |
| 6,056,443 A | 5/2000 | Koike et al. |
| 6,059,460 A | 5/2000 | Ono et al. |
| 6,059,830 A | 5/2000 | Lippincott, III et al. |
| 6,071,597 A | 6/2000 | Yang et al. |
| 6,083,313 A | 7/2000 | Venkatraman et al. |
| 6,083,570 A | 7/2000 | Lemelson et al. |
| 6,095,690 A | 8/2000 | Niegel et al. |
| 6,099,541 A | 8/2000 | Klopotek |
| 6,099,976 A | 8/2000 | Lemelson et al. |
| 6,106,919 A | 8/2000 | Lee et al. |
| 6,124,198 A | 9/2000 | Moslehi |
| 6,139,964 A | 10/2000 | Sathrum et al. |
| 6,142,481 A | 11/2000 | Iwashita et al. |
| 6,145,608 A | 11/2000 | Lund et al. |
| 6,156,439 A | 12/2000 | Coffinberry |
| 6,159,558 A | 12/2000 | Wolfe et al. |
| 6,160,683 A | 12/2000 | Boutaghou |
| 6,165,616 A | 12/2000 | Lemelson et al. |
| 6,170,156 B1 | 1/2001 | Lev et al. |
| 6,171,343 B1 | 1/2001 | Dearnaley et al. |
| 6,173,913 B1 | 1/2001 | Shafer et al. |
| 6,190,514 B1 | 2/2001 | Ma et al. |
| 6,193,906 B1 | 2/2001 | Kaneko et al. |
| 6,197,120 B1 | 3/2001 | David |
| 6,197,428 B1 | 3/2001 | Rogers |
| 6,203,651 B1 | 3/2001 | Järvenkylä et al. |
| 6,205,291 B1 | 3/2001 | Hughes et al. |
| 6,207,625 B1 | 3/2001 | Ogano et al. |
| 6,227,056 B1 | 5/2001 | Bills et al. |
| 6,237,441 B1 * | 5/2001 | Nishioka et al. ......... 123/90.51 |
| 6,237,852 B1 | 5/2001 | Svetal et al. |
| 6,238,839 B1 | 5/2001 | Tomita et al. |
| 6,255,262 B1 | 7/2001 | Keenan et al. |
| 6,261,424 B1 | 7/2001 | Goncharenko et al. |
| 6,273,793 B1 | 8/2001 | Liners et al. |
| 6,274,220 B1 | 8/2001 | Tsukuda et al. |
| 6,289,593 B1 | 9/2001 | Decker et al. |
| 6,293,648 B1 | 9/2001 | Anderson |
| 6,296,552 B1 | 10/2001 | Boutaghou et al. |
| 6,299,425 B1 | 10/2001 | Hirano et al. |
| 6,305,416 B1 | 10/2001 | Snel et al. |
| 6,309,283 B1 | 10/2001 | Liners et al. |
| 6,311,524 B1 | 11/2001 | Brennan, III et al. |
| 6,316,734 B1 | 11/2001 | Yang |
| 6,322,431 B1 | 11/2001 | Schaenzer et al. |
| 6,322,719 B2 | 11/2001 | Kaneko et al. |
| 6,324,060 B1 | 11/2001 | Hsu |
| 6,325,385 B1 | 12/2001 | Iwashita et al. |
| 6,329,328 B1 | 12/2001 | Koganei et al. |
| 6,333,298 B1 | 12/2001 | Waddoups et al. |
| 6,338,881 B1 | 1/2002 | Sellschopp et al. |
| 6,340,245 B1 | 1/2002 | Horton et al. |
| 6,358,123 B1 | 3/2002 | Liners et al. |
| 6,367,705 B1 | 4/2002 | Lee et al. |
| 6,368,676 B1 | 4/2002 | Gaudreau et al. |
| 6,377,422 B1 | 4/2002 | Boutaghou et al. |
| 6,379,383 B1 | 4/2002 | Palmaz et al. |
| 6,385,987 B2 | 5/2002 | Schlom et al. |
| 6,386,468 B1 | 5/2002 | Neuberger et al. |
| 6,399,215 B1 | 6/2002 | Zhu et al. |
| 6,401,058 B1 | 6/2002 | Akalin et al. |
| 6,439,845 B1 | 8/2002 | Veres |
| 6,439,986 B1 | 8/2002 | Myoung et al. |
| 6,452,752 B1 | 9/2002 | Boutaghou |
| 6,468,642 B1 | 10/2002 | Bray et al. |
| 6,471,979 B2 | 10/2002 | New et al. |
| 6,494,881 B1 | 12/2002 | Bales et al. |
| 6,523,456 B1 | 2/2003 | Kobayashi et al. |
| 6,524,212 B2 | 2/2003 | Ushijima et al. |
| 6,534,141 B1 | 3/2003 | Hull, Jr. et al. |
| 6,537,310 B1 | 3/2003 | Palmaz et al. |
| 6,537,429 B2 | 3/2003 | O'Donnell et al. |
| 6,543,394 B2 | 4/2003 | Tinney |
| 6,544,308 B2 | 4/2003 | Griffin et al. |
| 6,553,957 B1 | 4/2003 | Ishikawa et al. |
| 6,557,968 B2 | 5/2003 | Lee et al. |
| 6,562,445 B2 | 5/2003 | Iwamura |
| 6,562,462 B2 | 5/2003 | Griffin et al. |
| 6,570,172 B2 | 5/2003 | Kim et al. |
| 6,572,651 B1 | 6/2003 | DeScheerder et al. |
| 6,572,935 B1 | 6/2003 | He et al. |
| 6,572,937 B2 | 6/2003 | Hakovirta et al. |
| 6,585,064 B2 | 7/2003 | Griffin et al. |
| 6,586,069 B2 | 7/2003 | Dykes et al. |
| 6,589,640 B2 | 7/2003 | Griffin et al. |
| 6,592,519 B1 | 7/2003 | Martinez |
| 6,592,985 B2 | 7/2003 | Griffin et al. |
| 6,601,662 B2 | 8/2003 | Matthias et al. |
| 6,626,949 B1 | 9/2003 | Townley |
| 6,629,906 B1 | 10/2003 | Chiba et al. |
| 6,637,528 B2 | 10/2003 | Nishiyama et al. |
| 6,638,569 B2 | 10/2003 | McLaughlin et al. |
| 6,645,354 B1 | 11/2003 | Gorokhovsky |
| 6,656,329 B1 | 12/2003 | Ma et al. |
| 6,658,941 B1 | 12/2003 | Bills et al. |
| 6,666,328 B2 | 12/2003 | Sykora |
| 6,666,671 B1 | 12/2003 | Olver et al. |
| 6,684,513 B1 | 2/2004 | Clipstone et al. |
| 6,684,759 B1 | 2/2004 | Gorokhovsky |
| 6,695,865 B2 | 2/2004 | Boyle et al. |
| 6,699,106 B2 | 3/2004 | Myoung et al. |
| 6,701,627 B2 | 3/2004 | Korb et al. |
| 6,715,693 B1 | 4/2004 | Dam et al. |
| 6,726,993 B2 | 4/2004 | Teer et al. |
| 6,729,350 B2 | 5/2004 | Schick |
| 6,729,527 B2 | 5/2004 | Sonnenreich et al. |
| 6,733,513 B2 | 5/2004 | Boyle et al. |
| 6,739,214 B2 | 5/2004 | Griffin et al. |
| 6,739,238 B2 | 5/2004 | Ushijima et al. |
| 6,740,393 B1 | 5/2004 | Massler et al. |
| 6,745,742 B2 | 6/2004 | Meyer |
| 6,749,033 B2 | 6/2004 | Griffin et al. |
| 6,753,042 B1 | 6/2004 | Plotnikov et al. |
| 6,753,635 B2 | 6/2004 | Kuhlmann-Wilsdorf |
| 6,761,532 B2 | 7/2004 | Capone et al. |
| 6,761,736 B1 | 7/2004 | Woo et al. |
| 6,780,177 B2 | 8/2004 | Shafirstein et al. |
| 6,797,326 B2 | 9/2004 | Griffin et al. |
| 6,799,468 B2 | 10/2004 | Borenstein |
| 6,806,242 B2 | 10/2004 | Shirahama et al. |
| 6,818,029 B2 | 11/2004 | Myoung et al. |
| 6,820,676 B2 | 11/2004 | Palmaz et al. |
| 6,821,189 B1 | 11/2004 | Coad et al. |
| 6,821,624 B2 | 11/2004 | Utsumi et al. |
| 6,822,788 B2 | 11/2004 | Blitstein |
| 6,849,085 B2 | 2/2005 | Marton |
| 6,855,237 B2 | 2/2005 | Kolpakov et al. |
| 6,855,791 B2 | 2/2005 | Van Doren et al. |
| 6,861,098 B2 | 3/2005 | Griffin et al. |
| 6,861,137 B2 | 3/2005 | Griffin et al. |
| 6,865,952 B2 | 3/2005 | Bills et al. |
| 6,866,894 B2 | 3/2005 | Trankiem et al. |
| 6,871,700 B2 | 3/2005 | Gorokhovsky |
| 6,872,203 B2 | 3/2005 | Shafirstein et al. |
| 6,878,447 B2 | 4/2005 | Griffin et al. |
| 6,880,469 B2 | 4/2005 | Frost |
| 6,882,094 B2 | 4/2005 | Dimitrijevic et al. |

| | | |
|---|---|---|
| 6,883,476 B1 | 4/2005 | Nohara et al. |
| 6,885,521 B2 | 4/2005 | Kikuchi |
| 6,886,521 B2 | 5/2005 | Hamada et al. |
| 6,887,585 B2 | 5/2005 | Herbst-Dederichs |
| 6,890,700 B2 | 5/2005 | Tomita et al. |
| 6,893,720 B1 | 5/2005 | Nakahigashi et al. |
| 6,969,198 B2 | 11/2005 | Konishi et al. |
| 2001/0036800 A1 | 11/2001 | Liners et al. |
| 2002/0026899 A1 | 3/2002 | McLaughlin et al. |
| 2002/0031987 A1 | 3/2002 | Liners et al. |
| 2002/0034631 A1 | 3/2002 | Griffin et al. |
| 2002/0034632 A1 | 3/2002 | Griffin et al. |
| 2002/0051286 A1 | 5/2002 | Blitstein |
| 2002/0070357 A1 | 6/2002 | Kim et al. |
| 2002/0074168 A1 | 6/2002 | Matthias et al. |
| 2002/0089571 A1 | 7/2002 | Lee et al. |
| 2002/0090155 A1 | 7/2002 | Ushijima et al. |
| 2002/0090578 A1 | 7/2002 | Schaefera et al. |
| 2002/0130219 A1 | 9/2002 | Parseghian et al. |
| 2002/0148430 A1 | 10/2002 | Kano et al. |
| 2002/0155015 A1 | 10/2002 | Esumi et al. |
| 2002/0175476 A1 | 11/2002 | Chinou et al. |
| 2003/0012234 A1 | 1/2003 | Watson et al. |
| 2003/0019111 A1 | 1/2003 | Korb et al. |
| 2003/0019332 A1 | 1/2003 | Korb et al. |
| 2003/0021995 A1 | 1/2003 | Griffin et al. |
| 2003/0034182 A1 | 2/2003 | Griffin et al. |
| 2003/0035957 A1 | 2/2003 | Griffin et al. |
| 2003/0035958 A1 | 2/2003 | Griffin et al. |
| 2003/0036341 A1 | 2/2003 | Myoung et al. |
| 2003/0037640 A1 | 2/2003 | Griffin et al. |
| 2003/0069632 A1 | 4/2003 | De Scheerder et al. |
| 2003/0108777 A1 | 6/2003 | Gunsel et al. |
| 2003/0114094 A1 | 6/2003 | Myoung et al. |
| 2003/0128903 A1 | 7/2003 | Yasuda et al. |
| 2003/0159919 A1 | 8/2003 | Fairbairn et al. |
| 2003/0162672 A1 | 8/2003 | Shirahama et al. |
| 2003/0168323 A1 | 9/2003 | Frost |
| 2003/0180565 A1 | 9/2003 | Herbst-Dederichs |
| 2003/0199741 A1 | 10/2003 | Martinez |
| 2003/0234371 A1 | 12/2003 | Ziegler |
| 2003/0235691 A1 | 12/2003 | Griffin et al. |
| 2004/0003638 A1 | 1/2004 | Schaefer et al. |
| 2004/0008406 A1 | 1/2004 | Blitstein |
| 2004/0010068 A1 | 1/2004 | Doren et al. |
| 2004/0011900 A1 | 1/2004 | Gebhardt et al. |
| 2004/0027018 A1 | 2/2004 | LeBlanc et al. |
| 2004/0035375 A1 | 2/2004 | Gibisch et al. |
| 2004/0074467 A1 | 4/2004 | Hamada et al. |
| 2004/0092405 A1 | 5/2004 | Konishi et al. |
| 2004/0105806 A1 | 6/2004 | Griffin et al. |
| 2004/0109621 A1 | 6/2004 | Frost |
| 2004/0115435 A1 | 6/2004 | Griffin et al. |
| 2004/0133301 A1 | 7/2004 | Van Doren et al. |
| 2004/0154570 A1 | 8/2004 | Mabuchi et al. |
| 2004/0168326 A1 | 9/2004 | Korb et al. |
| 2004/0184687 A1 | 9/2004 | Morales et al. |
| 2004/0223256 A1 | 11/2004 | Feng et al. |
| 2004/0241448 A1 | 12/2004 | Kano et al. |
| 2004/0242435 A1 | 12/2004 | Nishimura et al. |
| 2004/0244539 A1 | 12/2004 | Korb et al. |
| 2004/0261614 A1 | 12/2004 | Hamada et al. |
| 2005/0001201 A1 | 1/2005 | Bocko et al. |
| 2005/0005892 A1 | 1/2005 | Nishimura et al. |
| 2005/0025975 A1 | 2/2005 | Okamoto et al. |
| 2005/0035222 A1 | 2/2005 | Hamada et al. |
| 2005/0037879 A1 | 2/2005 | Murata et al. |
| 2005/0056241 A1 | 3/2005 | Nomura et al. |
| 2005/0061291 A1 | 3/2005 | Nishimura et al. |
| 2005/0061636 A1 | 3/2005 | Frost et al. |
| 2005/0064196 A1 | 3/2005 | Martin et al. |
| 2005/0082139 A1 | 4/2005 | Ishikawa et al. |
| 2005/0084390 A1 | 4/2005 | Ueno et al. |
| 2005/0089685 A1 | 4/2005 | Hamada et al. |
| 2005/0098134 A1 | 5/2005 | Nishimura et al. |
| 2005/0100701 A1 | 5/2005 | Hamada et al. |
| 2005/0115744 A1 | 6/2005 | Griffin et al. |
| 2005/0188942 A1 | 9/2005 | Hamada et al. |

FOREIGN PATENT DOCUMENTS

| | | |
|---|---|---|
| DE | 643 034 | 3/1937 |
| DE | 19507086 A1 | 9/1996 |
| DE | 19507086 C2 | 9/1996 |
| DE | 197 04 224 | 8/1997 |
| DE | 198 15 989 | 10/1999 |
| DE | 198 25 860 | 12/1999 |
| DE | 19825860 A1 | 12/1999 |
| DE | 100 17 459 | 10/2000 |
| DE | 100 61 397 A1 | 5/2002 |
| DE | 101 58 683 | 6/2003 |
| DE | 103 18 135 | 11/2003 |
| DE | 10337559 A1 | 3/2005 |
| EP | 0 286 996 | 10/1988 |
| EP | 0 291 006 A2 | 11/1988 |
| EP | 0 299 785 | 1/1989 |
| EP | 0308143 B1 | 3/1989 |
| EP | 0 333 416 | 9/1989 |
| EP | 0378378 B1 | 7/1990 |
| EP | 0384772 A1 | 8/1990 |
| EP | 0388800 A2 | 9/1990 |
| EP | 0392125 A1 | 10/1990 |
| EP | 0398985 B1 | 11/1990 |
| EP | 407977 | 1/1991 |
| EP | 0 435 312 | 7/1991 |
| EP | 0474369 A1 | 3/1992 |
| EP | 0 500 253 | 8/1992 |
| EP | 0511153 A1 | 10/1992 |
| EP | 0 529 327 A1 | 3/1993 |
| EP | 0392125 B1 | 3/1993 |
| EP | 0546824 A1 | 6/1993 |
| EP | 0308143 A1 | 11/1993 |
| EP | 0573943 A1 | 12/1993 |
| EP | 0619504 A1 | 10/1994 |
| EP | 0621136 A2 | 10/1994 |
| EP | 0624353 A3 | 11/1994 |
| EP | 0624354 A3 | 11/1994 |
| EP | 0378378 B1 | 1/1995 |
| EP | 0651069 A1 | 5/1995 |
| EP | 0652301 A1 | 5/1995 |
| EP | 0656458 A3 | 6/1995 |
| EP | 0 661 470 A2 | 7/1995 |
| EP | 0396603 B1 | 6/1996 |
| EP | 0388800 B1 | 12/1996 |
| EP | 0 759 519 | 2/1997 |
| EP | 0474369 B1 | 3/1997 |
| EP | 0 818 622 | 1/1998 |
| EP | 0652301 B1 | 1/1998 |
| EP | 0826790 A1 | 3/1998 |
| EP | 0842754 A1 | 5/1998 |
| EP | 0 870 820 | 10/1998 |
| EP | 0816112 A3 | 10/1998 |
| EP | 0882759 A1 | 12/1998 |
| EP | 0893677 B1 | 1/1999 |
| EP | 0624353 B1 | 2/1999 |
| EP | 0656458 B1 | 2/1999 |
| EP | 0 905 221 A1 | 3/1999 |
| EP | 0 905 419 | 3/1999 |
| EP | 0647318 B1 | 3/1999 |
| EP | 0651069 B1 | 3/1999 |
| EP | 0 731 190 B1 | 5/1999 |
| EP | 0949200 A1 | 10/1999 |
| EP | 0845154 B1 | 11/1999 |
| EP | 0624354 B1 | 12/1999 |
| EP | 0582676 B1 | 3/2000 |
| EP | 1063085 A1 | 12/2000 |

| | | | | | | |
|---|---|---|---|---|---|---|
| EP | 1 067 211 | 1/2001 | | JP | 11-333773 A2 | 12/1999 |
| EP | 0850126 B1 | 1/2001 | | JP | 2000-88104 | 3/2000 |
| EP | 1076087 | 2/2001 | | JP | 2000-119843 | 4/2000 |
| EP | 1078736 A1 | 2/2001 | | JP | 2000-504089 A | 4/2000 |
| EP | 1109196 A1 | 6/2001 | | JP | 2000-297373 | 10/2000 |
| EP | 0778902 B1 | 9/2001 | | JP | 2000-327484 | 11/2000 |
| EP | 1 154 012 | 11/2001 | | JP | 2000-339083 | 12/2000 |
| EP | 0826790 B1 | 11/2001 | | JP | 2001-62605 | 3/2001 |
| EP | 1034320 B1 | 12/2001 | | JP | 2001-64005 | 3/2001 |
| EP | 0850133 B1 | 1/2002 | | JP | 2001-93141 A2 | 4/2001 |
| EP | 0893677 B1 | 1/2002 | | JP | 2001-172766 | 6/2001 |
| EP | 1184480 A2 | 3/2002 | | JP | 2001-172766 A2 | 6/2001 |
| EP | 1190791 A3 | 4/2002 | | JP | 2001-192864 | 7/2001 |
| EP | 1219464 A2 | 7/2002 | | JP | 2001-269938 | 10/2001 |
| EP | 1 233 054 A1 | 8/2002 | | JP | 2001-280236 | 10/2001 |
| EP | 0971812 B1 | 10/2002 | | JP | 2002-265968 A2 | 9/2002 |
| EP | 1018291 B1 | 10/2002 | | JP | 2002-309912 | 10/2002 |
| EP | 1281513 A2 | 2/2003 | | JP | 2002-332571 | 11/2002 |
| EP | 1 300 608 | 4/2003 | | JP | 2003-13163 | 1/2003 |
| EP | 0950123 B1 | 5/2003 | | JP | 2003-13799 | 1/2003 |
| EP | 0882759 B1 | 6/2003 | | JP | 2003-25117 | 1/2003 |
| EP | 1 338 641 | 8/2003 | | JP | 2003-28174 A2 | 1/2003 |
| EP | 1340605 A1 | 9/2003 | | JP | 2003-088929 | 3/2003 |
| EP | 1365141 A1 | 11/2003 | | JP | 2003-113941 | 4/2003 |
| EP | 1083946 B1 | 12/2003 | | JP | 2003-147508 | 5/2003 |
| EP | 1078736 B1 | 1/2004 | | JP | 2004-36788 A2 | 2/2004 |
| EP | 1378271 A1 | 1/2004 | | JP | 2005-68529 A2 | 3/2005 |
| EP | 0757615 B1 | 3/2004 | | RU | 1770350 A1 | 10/1992 |
| EP | 0842754 B1 | 3/2004 | | RU | 2004586 C1 | 12/1993 |
| EP | 1 411 145 | 4/2004 | | RU | 2153782 C1 | 7/2000 |
| EP | 0862395 B1 | 4/2004 | | WO | WO89/06707 A1 | 7/1989 |
| EP | 1 418 353 A2 | 5/2004 | | WO | WO89/06708 A1 | 7/1989 |
| EP | 1440775 A1 | 7/2004 | | WO | WO8906338 A1 | 7/1989 |
| EP | 1445119 A1 | 8/2004 | | WO | WO92/02602 A1 | 2/1992 |
| EP | 1475557 A1 | 11/2004 | | WO | WO9206843 A1 | 4/1992 |
| EP | 1481699 A1 | 12/2004 | | WO | WO9219425 A2 | 11/1992 |
| EP | 1482190 A2 | 12/2004 | | WO | WO93/21288 | 10/1993 |
| EP | 1498597 A1 | 1/2005 | | WO | WO93/21289 A1 | 10/1993 |
| EP | 1 510 594 A2 | 3/2005 | | WO | WO9324828 A1 | 12/1993 |
| EP | 1311885 B1 | 3/2005 | | WO | WO95/20253 A2 | 7/1995 |
| EP | 1512781 A2 | 3/2005 | | WO | WO95/29044 A1 | 11/1995 |
| EP | 1183470 B1 | 4/2005 | | WO | WO95/29273 A1 | 11/1995 |
| FR | 2 669 689 | 5/1992 | | WO | WO95/31584 A1 | 11/1995 |
| GB | 768226 | 2/1957 | | WO | WO96/04485 | 2/1996 |
| GB | 1005638 | 10/1988 | | WO | WO96/05333 A1 | 2/1996 |
| GB | 2338716 | 12/1999 | | WO | WO 96/05942 A1 | 2/1996 |
| IE | 0990532 A1 | 3/2001 | | WO | WO96/05942 A1 | 2/1996 |
| JP | 62-111106 | 5/1987 | | WO | WO96/06961 A1 | 3/1996 |
| JP | 63-21209 A2 | 1/1988 | | WO | WO96/12389 A1 | 4/1996 |
| JP | 63-288994 A2 | 11/1988 | | WO | WO96/24488 A1 | 8/1996 |
| JP | 5-70879 | 3/1993 | | WO | WO96/40446 A1 | 12/1996 |
| JP | 5-36004 | 5/1993 | | WO | WO97/07531 A1 | 2/1997 |
| JP | 5-42616 | 6/1993 | | WO | WO97/10093 A1 | 3/1997 |
| JP | 6-264993 | 9/1994 | | WO | WO97/10940 A1 | 3/1997 |
| JP | 6-294307 A | 10/1994 | | WO | WO97/14555 | 4/1997 |
| JP | 7-63135 | 3/1995 | | WO | WO97/16138 A1 | 5/1997 |
| JP | 7-90553 A | 4/1995 | | WO | WO98/02715 A1 | 1/1998 |
| JP | 7-103238 | 4/1995 | | WO | WO98/12994 A1 | 4/1998 |
| JP | 07-118832 | 5/1995 | | WO | WO98/13528 A1 | 4/1998 |
| JP | 7-41386 A2 | 10/1995 | | WO | WO98/47141 A1 | 10/1998 |
| JP | 7-286696 | 10/1995 | | WO | WO99/09547 A1 | 2/1999 |
| JP | 8-14014 | 1/1996 | | WO | WO99/12404 A1 | 3/1999 |
| JP | 8-61499 | 3/1996 | | WO | WO99/14512 A1 | 3/1999 |
| JP | 9-20981 A2 | 1/1997 | | WO | WO99/16371 A1 | 4/1999 |
| JP | 52006318 | 1/1997 | | WO | WO99/22694 A2 | 5/1999 |
| JP | 253770 A2 | 9/1997 | | WO | WO99/27157 A1 | 6/1999 |
| JP | 10-088369 A2 | 4/1998 | | WO | WO 99/29477 A1 | 6/1999 |
| JP | 10-265790 | 10/1998 | | WO | WO99/29477 A1 | 6/1999 |
| JP | 10-298440 A2 | 11/1998 | | WO | WO99/31557 | 6/1999 |
| JP | 11-22423 | 1/1999 | | WO | WO99/34385 A1 | 7/1999 |
| JP | 11-190406 | 7/1999 | | WO | WO99/46847 A1 | 9/1999 |
| JP | 11-292629 A2 | 10/1999 | | WO | WO99/54520 A1 | 10/1999 |
| JP | 11-294118 | 10/1999 | | WO | WO99/54934 A1 | 10/1999 |

| | | | |
|---|---|---|---|
| WO | WO99/57743 A1 | 11/1999 |
| WO | WO99/62077 A1 | 12/1999 |
| WO | WO 99/62572 A1 | 12/1999 |
| WO | WO99/62572 A1 | 12/1999 |
| WO | WO 00/22613 A1 | 4/2000 |
| WO | WO 00/24554 A1 | 5/2000 |
| WO | WO 00/25410 A1 | 5/2000 |
| WO | WO 00/28142 A1 | 5/2000 |
| WO | WO 00/33051 A1 | 6/2000 |
| WO | WO 00/35000 A1 | 6/2000 |
| WO | WO 00/44032 A1 | 7/2000 |
| WO | WO 00/47402 A1 | 8/2000 |
| WO | WO 00/55385 A1 | 9/2000 |
| WO | WO 00/56127 A1 | 9/2000 |
| WO | WO 00/56393 A1 | 9/2000 |
| WO | WO 00/62327 A2 | 10/2000 |
| WO | WO 00/68451 A2 | 11/2000 |
| WO | WO 00/75517 A1 | 12/2000 |
| WO | WO 00/78504 A1 | 12/2000 |
| WO | WO 01/05917 A1 | 1/2001 |
| WO | WO 01/006033 A1 | 2/2001 |
| WO | WO 01/14736 A1 | 3/2001 |
| WO | WO 01/14745 A1 | 3/2001 |
| WO | WO 01/26862 A1 | 4/2001 |
| WO | WO 01/37631 A2 | 5/2001 |
| WO | WO 01/40537 A1 | 6/2001 |
| WO | WO 01/47451 A1 | 7/2001 |
| WO | WO 01/59544 A2 | 8/2001 |
| WO | WO 01/61182 | 8/2001 |
| WO | WO 01/61719 A1 | 8/2001 |
| WO | WO 01/62372 A1 | 8/2001 |
| WO | WO 01/63639 A1 | 8/2001 |
| WO | WO 01/67834 A1 | 9/2001 |
| WO | WO 01/79583 A2 | 10/2001 |
| WO | WO 01/80224 A2 | 10/2001 |
| WO | WO 02/006875 A1 | 1/2002 |
| WO | WO 02/13188 A1 | 2/2002 |
| WO | WO 02/24601 A1 | 3/2002 |
| WO | WO 02/24603 A1 | 3/2002 |
| WO | WO 02/24970 A2 | 3/2002 |
| WO | WO 02/32625 A2 | 4/2002 |
| WO | WO 02/44440 A1 | 6/2002 |
| WO | WO 02/054454 A2 | 7/2002 |
| WO | WO 02/062714 A2 | 8/2002 |
| WO | WO 02/073021 | 9/2002 |
| WO | WO 02/080996 A1 | 10/2002 |
| WO | WO 02/085237 A2 | 10/2002 |
| WO | WO 02/090461 A1 | 11/2002 |
| WO | WO 02/097289 A1 | 12/2002 |
| WO | WO 03/009978 A1 | 2/2003 |
| WO | WO 03/013990 A1 | 2/2003 |
| WO | WO 03/020329 A1 | 3/2003 |
| WO | WO 03/021731 A1 | 3/2003 |
| WO | WO 03/031543 A2 | 4/2003 |
| WO | WO 03/046508 A3 | 6/2003 |
| WO | WO 03/054876 A1 | 7/2003 |
| WO | WO 03/076309 A2 | 9/2003 |
| WO | WO 03/078679 A1 | 9/2003 |
| WO | WO 03/091758 A2 | 11/2003 |
| WO | WO 03/095009 A1 | 11/2003 |
| WO | WO 03/105134 A1 | 12/2003 |
| WO | WO 2004/001804 A2 | 12/2003 |
| WO | WO 2004/004998 A1 | 1/2004 |
| WO | WO 2004/019809 A2 | 3/2004 |
| WO | WO 2004/024206 A1 | 3/2004 |
| WO | WO 2004/026359 A1 | 4/2004 |
| WO | WO 2004/026500 A2 | 4/2004 |
| WO | WO 2004/036169 A1 | 4/2004 |
| WO | WO 2004/036292 A2 | 4/2004 |
| WO | WO 2004/038701 A2 | 5/2004 |
| WO | WO 2004/043631 A1 | 5/2004 |
| WO | WO 2004/048126 A2 | 6/2004 |
| WO | WO 2004/067466 A1 | 8/2004 |
| WO | WO 2004/068530 A1 | 8/2004 |
| WO | WO 2004/071670 A1 | 8/2004 |
| WO | WO 2004/072959 A2 | 8/2004 |
| WO | WO 2004/078424 A2 | 9/2004 |
| WO | WO 2004/084773 A1 | 10/2004 |
| WO | WO 2004/088113 A1 | 10/2004 |
| WO | WO 2005/010596 A2 | 2/2005 |
| WO | WO 2005/011744 A2 | 2/2005 |
| WO | WO 2005/014760 A1 | 2/2005 |
| WO | WO 2005/014882 A1 | 2/2005 |
| WO | WO 2005/016620 A2 | 2/2005 |
| WO | WO 2005/021851 A1 | 3/2005 |
| WO | WO 2005/025844 A1 | 3/2005 |
| WO | WO 2005/034791 A1 | 4/2005 |
| WO | WO 2005/037144 A2 | 4/2005 |
| WO | WO 2005/037985 A2 | 4/2005 |
| WO | WO 2005/040451 A1 | 5/2005 |
| WO | WO 2005/042064 A1 | 5/2005 |
| WO | WO 2005/047737 A1 | 5/2005 |

OTHER PUBLICATIONS

Kano et al., "Friction Property of Hard Carbon Film in Engine Oil", Japan Tribology Congress 1999, 5, Tokyo, Proceeding pp. 11 and 12.

Kano et al, "The Effect of ZDDP and MODTC Additives on Friction Properties of DLC and Steel Cam Follower in Engine Oil", Abstracts of Papers from $2^{nd}$ World Tribology Congress, Sep. 3-7, 2001, p. 342.

Japanese Industrial Standard, "Carbon Steels for Machine Structural Use", Japanese Standards Association, JIS G 4051, 1979, pp. 1-10.

Japanese Industrial Standard, "Chromium Steels", Japanese Standards Association, JIS G 4104, 1979, pp. 1-9.

"Standard Test Method for Separation of Representative Aromatics and Nonaromatics Fractions of High-Boiling Oils by Elution Chromatography", ASTM Designation: D 2549-91 (Reapproved 1995), pp. 895-900.

International Standard, "Petroleum products—Determination of Base Number—Perchloric Acid Potentiometric Titration Method", ISO 3771, Second Edition Aug. 15, 1994, pp. 1-8.

"Assessment of $2^{nd}$ to $5^{th}$ Order Irregularities of Surface Configuration by Means of Sections of Surfaces Definitions Relating to Reference System and Dimensions," DIN 4762, UDC 621-288:001.4 (Aug. 1960), pp. 1-4.

Engine Oil Viscosity Classification—SAE J300 revised Apr. 1997, p. 133.

API Motor Oil Guide, "Which Oil is Right for You", American Petroleum Institute, Copyright 2002.

Dr. Marx, "Surfaces and Contact Mechanics", XP-002233233, Google, Retrieved from the Internet, Mar. 3, 2003, pp. 1-18.

Patent Abstracts of Japan, vol. 2000, No. 09, Oct. 13, 2000, JP 2000-170768, Jun. 20, 2000.

Patent Abstracts of Japan, vol. 2000, No. 01, Jan. 31, 2000, JP 11-287329, Oct. 19, 1999.

Patent Abstracts of Japan, vol. 1996, No. 09, Sep. 30, 19996, JP 08-128448, May 21, 1996.

"Geometrical Product Specifications (GPS)—Surface Texture: Profile Method—Terms, Definitions and Surface Texture Parameters," International Standard, ISO 4287, TC 213 (1997), pp. 1-25.

JIS Japanese Industrial Standard; "Surface Roughness—Definitions and Designation"; JIS B 0601; 1994. (w/Translation).

JIS Japanese Industrial Standard; "Chromium Molybdenum Steels"; JIS G 4105; 1979; (w/Translation).

JIS Japanese Industrial Standard; "High Carbon Chromium Bearing Steels"; JIS G 4805; 1999; (w/Translation).

JIS Japanese Industrial Standard; "Vickers Hardness Test—Test Method"; JIS Z 2244; 1998; (w/Translation).

Meyer-Rässler, "Neuartige Laufflächen-Schutzverfahren für Kolben von Verbrennungsmotoren," VDI-Zeitschrift, 1942, vol. 86, No. 15/16, pp. 245 to 247.

Gåhlin, Rickard et al., "ME-C:H Coatings in Motor Vehicles," WEAR 249, 2001, pp. 302-309.

Hershberger, J., et al., "Evaluation of DLC Coatings for Spark-Ignited, Direct-Injected Fuel Systems," *Surface & Coatings Technology*, 179, 2004, pp. 237-244.

Hershberger, J, et al., "Friction and Wear Behavior of Near-Frictionless Carbon Coatings in Formulated Gasolines," *Surface & Coating Technology*, 183, 2004, pp. 111-117.

Kovalchenko, A., et al., "Friction and Wear Performance of Low-Friction Carbon Coatings Under Oil Lubrication," Energy Technology Div., Argonne National Laboratory.

Ajayi, O., et al., "Effect of Carbon Coating on Scuffing Performance in Diesel Fuels," *Tribology Transactions*, vol. 44, 2001, pp. 298-304.

Ajayi, O., et al., Effect of Thin-Film Coating on Wear in EGR-Contaminated Oil, Energy Technology Div., Argonne National Laboratory.

Fujimori, N., et al., "Characterization of Conducting Diamond Films," *Vacuum*, vol. 36, Nos. 1-3, 1996, pp. 99-102.

Patent/Literature Search Report, Bawa Biotechnology Consulting, LLC, Jun. 3, 2005 (201 pages).

"Aluminium Alloy Die Castings," Japanese Industrial Standard (JIS H 5302), 2000, pp. 1-12.

"Aluminium Alloys Castings", Japanese Industrial Standard (JIS H 5202), 1999, pp. 1-18.

Japanese Industrial Standard, "Aluminium Alloy Castings", JIS H 5202, 1999, pp. 1910, 1911 and 1636-1647.

"Aluminum Alloy Die Castings," JIS H5302 (2000), pp. 1670-1681.

"Carbon Steels for Machine Structural Use", Japanese Industrial Standard (JIS G 4051), 1979, pp. 1381-1383.

D.G. Watson et al., "Engineering Drawing Practice," XP002281300, University of Hertfordshire, Sep. 1991, p. 29, Figure 38.

"Geometrical Product Specifications (GPS)—Surface texture: Profile method—Terms, definitions and surface texture parameters", Japanese Industrial Standard (JIS B 0601) Machine Elements, 2003, pp. 6, 7, 263-287, and 2586.

"Grey iron castings", Japense Industrial Standard (JIS G 5501), pp. 2075-2077.

International Standard "Application of Carbides for Machining by Chip Removal—Designation of the Main Groups of Chip Removal and Groups of Application," ISO 513, (1975), pp. 67-69.

Japanese Industrial Standard, "Structural Steels with Specified Hardenability Bands", JIS G 4052, 1979, pp. 2414, 2415, 1390-1403, 1410 and 1411.

Japanese Industrial Standard, 2001, No. B 0601.

K. Holmberg et al., "Tribological Characteristics of Diamond-like Carbon Coatings," VTT Symposium, Technical Research Centre of Finland, XP000570636, 1994, pp. 24-238.

M. Kano et al., "The Effect of ZDDP and MODTC Additives on Friction Properties of DLC and Steel Cam Follower in Engine Oil", Abstracts of Papers from 2nd World Tribology Congress, Sep. 3-7, 2001, p. 342.

Meyer-Rässler, "Neuartige LauffIächen-Schutzverfahren für Kolben von Verbrennungsmotoren," VDI-Zeitschrift, 1942, vol. 86, No. 15/16, pp. 245 to 247.

PCT/IB2004/002552.

"Stainless Steel Bars", Japanese Industrial Standard (JIS G 4303), pp. 1457-1477.

"Standard Practice for Codification of Certain Nonferrous Metals and Alloys, Cast and Wrought1", ASTM International, Designation: B 275-02, Jun. 2002, pp. 1-7.

"Standard Test Method for Calibration and Operation of the Falex Block-on-Ring Friction and Wear Testing Machine", ASTM Designation: D2714-88, Jan. 1989, pp. 383-386.

Steve J. Bull et al., "High-Performance Diamond and Diamond-like Coatings", JOM, Apr. 1995, pp. 16-19, vol. 47, No. 4, XP 000500980.

Patent Abstracts of Japan, vol. 2003, No. 12, Dec. 5, 2003, JP 2004-155891, Jun. 3, 2004.

U.S. Appl. No. 10/911,741, filed May 5, 2004, Ueno.

Ronkainen, Helena, "Tribological Properties of Hydrogenated and Hydrogen-Free Diamond-Like Carbon Coatings," Disseration for the Degree of Doctor of Science in Technology, VTT Publications No. 434.

* cited by examiner

SLIDABLY MOVABLE MEMBER AND METHOD OF PRODUCING SAME

The present application is a continuation of U.S. application Ser. No. 09/545,181, filed Apr. 7, 2000 now U.S. Pat. No. 6,844,068, the entire contents of which are incorporated herein by reference.

BACKGROUND OF THE INVENTION

This invention relates to improvements in a slidably movable member having a hard carbon-based film which is low in friction, and more particularly to the slidably movable member having the hard carbon-based film suitable to be used in a condition to be in contact with engine lubricating oil, transmission oil or the like.

Hitherto, formation of hard carbon-based films have been proposed and put into practical use. The hard carbon-based films are formed of carbon-based materials such as amorphous carbon (a-C), a hydrogen-containing amorphous carbon (a-C:H), i-carbon (i-C) and diamond like carbon (DLC). The carbon-based films are usually formed by a plasma enhanced chemical vapor deposition (CVD) process in which hydrocarbon gas is plasma-decomposed to form the carbon-based film, or by an ion beam vapor deposition process using carbon and hydrocarbon ions. The thus formed carbon-based film has a high surface hardness and a high surface smoothness, and a high wear-resistance. Additionally, the carbon-based film is low in friction coefficient owing to solid lubricating characteristics, thereby exhibiting a low friction characteristics. The carbon-based film has a friction coefficient of about 0.1 under the condition of no lubrication, whereas a normal steel having a smooth surface has a friction coefficient ranging from 0.5 to 1.0 under the condition of no lubrication.

The hard carbon-based films have been presently applied to slidably movable members or parts to be used in a condition of no lubrication, for example, cutting tools such as a blade of a drill, processing jigs for the cutting tool, metal dies for plastic working, valve cocks and capstan rollers. Additionally, machine parts (such as those of an internal combustion engine) slidably movable in lubricating oil have been increasingly required to be reduced in mechanical loss from the viewpoints of energy saving and environmental protection. Particularly, such machine parts have been required to be lowered in friction by using the above-discussed hard carbon-based film having the solid lubricating characteristics in case that they are used in a section which is in a severe frictional condition causing a high friction loss.

SUMMARY OF THE INVENTION

In this regard, in case that a slidably movable member is coated with the above-mentioned hard carbon-based film and used to be slidably moved in engine lubricating oil, transmission oil or the like, a low friction characteristics can be obtained to some extent owing to the smoothness of the hard carbon-based film. However, it has been revealed, as a problem, that the slidably movable member coated with the hard carbon-based film is generally equal in low friction characteristics to other slidably movable members coated with hard films having no solid lubricating characteristics, such as those formed by ion plating of titanium nitride (TiN) or chromium nitride (CrN). In other words, it has been revealed, as a problem, that the slidably movable member coated with the conventional carbon-based film is generally equal in low friction characteristics in lubricating oil to slidably movable members coated with the film having no solid lubricating characteristics and the generally same surface roughness, or to superfinished steel members, even though they coated with the conventional carbon-based film have the solid lubricating characteristics.

More specifically, for example, when three steel balls having a ⅜ inch diameter are pushed onto the hard carbon-based film of diamond like carbon under a load of 1 kgf in lubricating oil and slid at a relative speed of 0.03 m/sec., the hard-carbon based film of diamond like carbon exhibits a friction coefficient ranging from 0.08 to 0.12 which is the generally same as that of the ion-plated chromium nitride (CrN) film or that of a steel material having the generally same surface roughness and provided with no hard coating treatment.

In addition, slidably movable members or parts coated with molybdenum disulfide ($MoS_2$) or polytetrafluoroethylene (PTFE) having solid lubricating characteristics have been put into practical use in order to realize a low friction characteristics having a friction coefficient $\mu$ lower than 0.07 in lubricating oil such as engine lubricating oil or transmission oil. However, in case that such conventional slidably movable members or parts are used in further severe conditions and under a high bearing pressure, they are insufficient in wear resistance so that a necessary performance of wear resistance may be achieved only at an initial period in service but cannot be maintained for a long period of time in service.

It is an object of the present invention to provide an improved slidably movable member which can effectively overcome drawbacks encountered in conventional slidably movable members which are used in contact with lubricating oil.

Another object of the present invention is to provide an improved slidably movable member which is high in wear resistance even in a condition to be in contact with lubricating oil, throughout a long period of time in service.

A further object of the present invention is to provide an improved slidably movable member whose solid lubricating characteristics is effective even in lubricating oil so as to exhibit a low friction characteristics having a friction coefficient $\mu$ of not higher than 0.07.

A first aspect of the present invention resides in a slidably movable member used in contact with lubricating oil. The slidably movable member comprises a substrate. A hard carbon-based film is coated on a surface of the substrate. The hard carbon-based film has a surface section which contains at least one of nitrogen and oxygen in an amount ranging from 0.5 to 30 at %.

A second aspect of the present invention resides in an adjusting shim used in a valve operating mechanism of an internal combustion engine. The adjusting shim comprises a substrate. A hard carbon-based film is coated on a surface of the substrate. The hard carbon-based film has a surface section which contains at least one of nitrogen and oxygen in an amount ranging from 0.5 to 30 at %.

A third aspect of the present invention resides in a slidably movable member used in contact with lubricating oil. The slidably movable member comprises a substrate. A hard carbon-based film is coated on a surface of the substrate. The hard carbon-based film having a surface section which contains hydrogen in an amount of not more than 10 at %.

A fourth aspect of the present invention resides in a slidably movable member used in contact with lubricating oil. The slidably movable member comprises a substrate. A hard carbon-based film is coated on a surface of the substrate. The hard carbon-based film having a surface section which contains at least one of nitrogen in an amount ranging from 0.5 to 30 at %, oxygen in an amount ranging from 0.5 to 30 at %, and hydrogen in an amount of not more than 10 at %.

A fifth aspect of the present invention resides in a method of producing a slidably movable member used in contact with lubricating oil. The producing method comprises (a) preparing a substrate; (b) coating a hard carbon-based film on a surface of the substrate by a chemical vapor deposition process; and (c) causing a surface section of the hard carbon-based film to contain at least one of nitrogen and oxygen in an amount ranging from 0.5 to 30 at % by one of a plasma treatment and an ion implantation process.

A sixth aspect of the present invention resides in a method of producing a slidably movable member used in contact with lubricating oil. The producing method comprises (a) preparing a substrate; and (b) coating a hard carbon-based film on a surface of the substrate by one of a carbon ion beam process, a thermal chemical vapor deposition process, an ion plating process, and a sputtering process, to cause a content of hydrogen in a surface section of the hard carbon-based film to fall within a range of not more than 10 at %.

DETAILED DESCRIPTION OF THE INVENTION

According to the present invention, a slidably movable member used in contact with lubricating oil comprises a substrate. Additionally, a hard carbon-based film is coated on a surface of the substrate. The hard carbon-based film is a film whose main component is carbon. The hard carbon-based film has a surface section which contains at least one of nitrogen and oxygen in an amount ranging from 0.5 to 30 at % (atomic percent) and/or hydrogen in an amount of not more than 10 at %. The surface section of the hard carbon-based film includes a surface of the hard carbon-based film. More specifically, the hard carbon-based film has a thickness ranging from 1 to 10 μm, in which the thickness of the surface section is 1/10 of that of the surface section. Accordingly, at least the surface section of the hard carbon-based film contains nitrogen and/or oxygen in the above-mentioned amount. It will be understood that nitrogen and/or oxygen may be contained in the above-mentioned amount in the hard carbon-based film other than the surface section.

In the thus arranged slidingly movable member having hard carbon-based film whose surface section contains at least one of nitrogen and oxygen in an amount ranging from 0.5 to 30 at %, a large amount of polar groups are present at the surface of the hard carbon-based film, and therefore oiliness agents contained in lubricating oil are liable to be physically or chemically adsorbed at the surface of the hard carbon-based film. As a result, a low friction characteristics can be provided to the hard carbon-based film so that the hard carbon-based film exhibits a low coefficient of friction μ of not higher than 0.07. In this regard, if the content (amount) of nitrogen and/or oxygen in the surface section of the hard carbon-based film is less than 0.5 at %, there is a tendency that the above-mentioned low friction characteristics in lubricating oil cannot be realized. In contrast, if the content exceeds 30 at %, wear resistance under a high bearing pressure is insufficient. Preferably, the content of nitrogen and/or oxygen is within a range of from 4 to 20 at %, which effectively provides a low friction characteristics in lubricating oil without degrading a wear resistance and a smoothness of the hard carbon-based film. The content of nitrogen and/or oxygen is measured by a X-ray photoelectron spectra (XPS) "ESCA-5600" produced by PHI (Physical Electronics, Inc.).

The slidably movable member is produced by a method comprising (a) preparing a substrate; (b) coating a hard carbon-based film on a surface of the substrate by a chemical vapor deposition process; and (c) causing a surface section of the hard carbon-based film to contain at least one of nitrogen and oxygen in an amount ranging from 0.5 to 30 at % by one of a plasma treatment and an ion implantation process.

Figure 2:
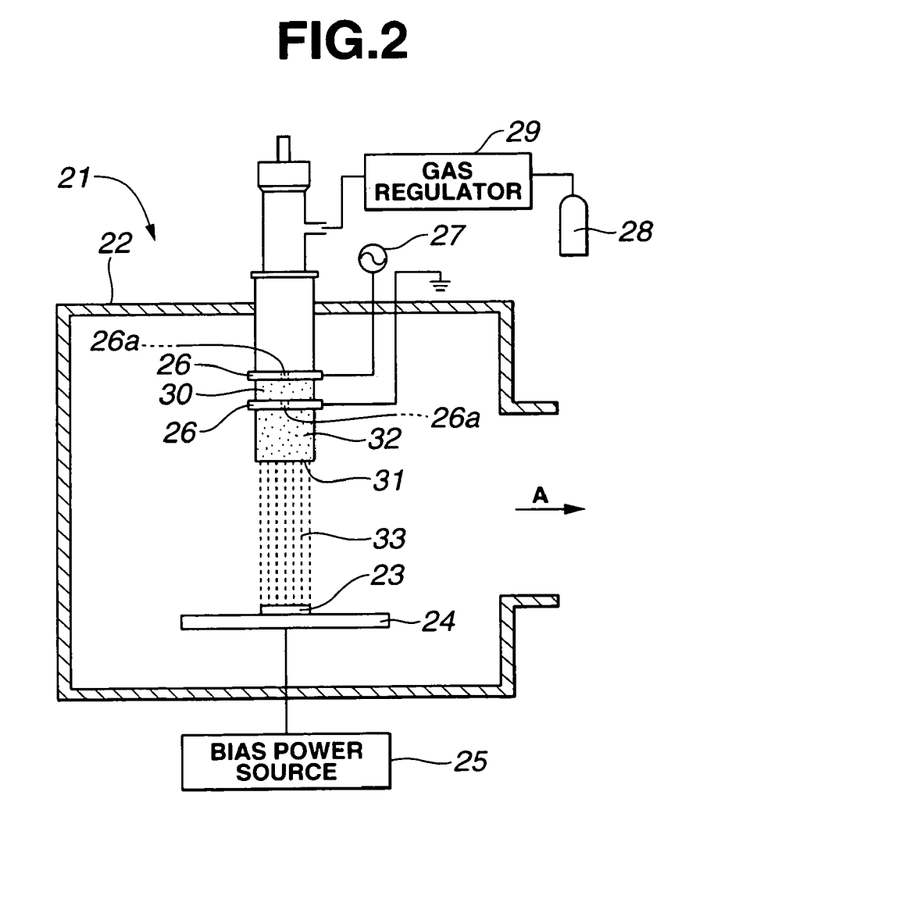
FIG. 2 is an explanatory sectional view of a plasma treatment apparatus used for accomplishing a plasma treatment on a hard carbon-based film formed on a substrate, so as to produce the slidably movable member according to the present invention.

Under a plasma treatment, nitrogen and/or oxygen are supplied to be contained in the surface section of the hard carbon-based film. The plasma treatment is carried out by using a plasma treatment apparatus 21 as shown in FIG. 2. The plasma treatment apparatus 21 includes a vacuum vessel 22. A substrate holder 24 is disposed inside the vacuum vessel 22 and located at a lower position in order to support the substrate (coated with the hard carbon-based film) 23 constituting the slidably movable member 1. The substrate holder 24 is electrically connected to a bias power source 25. RF electrodes 26 are provided above the substrate holder 24 and electrically connected to a RF power source 27.

A plasma forming gas contained in a gas bomb 28 is supplied through a gas regulator 29 to the RF electrodes 26 each having a central opening 26a, so that plasma is formed between the electrodes 26 under RF discharge. Then, ion 32 is formed in an aperture electrode 31 so that radical ion beam 33 reaches the surface section of the hard carbon-based film formed at the surface of the substrate 23. Consequently, the plasma forming gas is contained in the surface section of the hard carbon-based film. Evacuation of the vacuum vessel 22 is accomplished in a direction indicated by an arrow A by an evacuator (not shown). Such a plasma treatment is accomplished, for example, under a condition where a RF input power is within a range of from 10 to 100 W; a flow rate of the plasma forming gas is within a range of from 5 to 50 cc/min.; and a bias voltage applied from the bias power source 25 is within a range of from −250 to +250 V.

While the plasma treatment has been discussed to cause the surface section of the hard carbon-based film to contain nitrogen and/or oxygen, it will be understood that an ion implantation may be used for the same purpose.

Otherwise, the low friction characteristics in lubricating oil can be obtained by controlling the content or concentration of hydrogen at a level of not more than 10 at % in the surface section of the hard carbon-based film. Although measurement of content of hydrogen in the surface section is difficult, the content can be readily estimated from conditions where formation of the hard carbon-based film is accomplished. Accordingly, such a low content of hydrogen can be realized by forming the hard carbon-based film of amorphous carbon by a carbon ion beam process or the like in which hydrocarbon plasma is not used at least during formation of the hard carbon-based film, or by forming the hard carbon-based film of a diamond polycrystal by a thermal chemical vapor deposition (CVD) process. Additionally, such a low content of hydrogen can be realized by forming the hard carbon-based film by an ion plating process, or by a sputtering process. With the thus formed hard carbon-based film, a large amount of polar groups are present at the surface of the hard carbon-based film, and therefore oiliness agents contained in lubricating oil are liable to be physically or chemically adsorbed at the surface of the hard carbon-based film. It will be understood that hydrogen may be contained in the above-mentioned amount in the hard carbon-based film other than the surface section.

Further, it is preferable that the hard carbon-based film has a surface roughness Ra of not higher than 0.1 µm, so that the hard carbon-based film can have a low friction characteristics and a low aggressivity against an opposite member to which the slidably movable member is contacted. The surface roughness Ra is measured according to JIS (Japanese Industrial Standard) B 0601. Additionally, it is also preferable that the hard carbon-based film has a surface hardness Hv (by Vickers hardness test according to JIS Z 2244) of not lower than 1000. It is also preferable that the hard carbon-based film has a thickness ranging from 1 to 10 µm. If the thickness is lower than 1 µm, the hard carbon-based film is insufficient in adherence strength. If the thickness exceeds 10 µm, residual stress in the hard carbon-based film is high so that the hard carbon-based film may naturally peel off. The thickness of the hard carbon-based film is microscopically measured.

Figure 1:
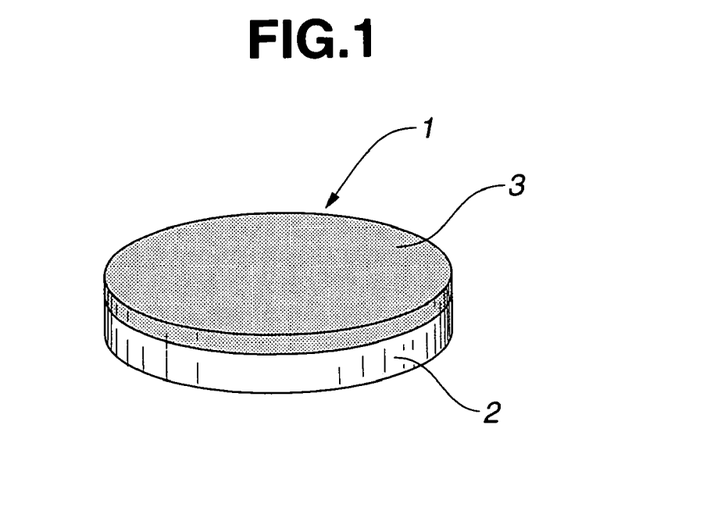
FIG. 1 is an explanatory perspective view of an embodiment (adjusting shim) of a slidably movable member according to the present invention.

The slidably movable member 1 is preferably used as an adjusting shim in the form shown in FIG. 1. The adjusting shim is, for example, mounted on a valve lifter for an engine valve (intake or exhaust valve) of an internal combustion engine of an automotive vehicle. The valve lifter forms part of a valve operating mechanism for operating the engine valve under drive of the engine. The adjusting shim is in slidable contact with a camshaft in a condition to be coated with lubricating oil. The adjusting shim functions to adjust a valve clearance of the engine valve.

EXAMPLES

The present invention will be more readily understood with reference to the following Examples in comparison with Comparative Examples; however, these Examples are intended to illustrate the invention and are not to be construed to limit the scope of the invention.

Example 1

First, a disc-shaped substrate 2 made of ceramic (silicon nitride) was prepared to have a dimension of a 30 mm diameter and a 4 mm thickness, as shown in FIG. 1. A diamond polycrystal film (synthesized in gas phase) having a thickness of 10.0 µm was deposited on an upper surface of the substrate 2 by a thermal CVD process to form a hard carbon-based film 3 as shown in FIG. 1. The surface section of the hard carbon-based film 3 was estimated to contain hydrogen in an amount less than 10 at %. Subsequently, the surface of the diamond polycrystal film or hard carbon-based film 3 was ground to be finished by a diamond wheel or abrasive grain thereby obtaining a surface roughness Ra of 0.05 µm. As a result, a slidably movable member 1 as shown in FIG. 1 was produced.

Example 2

First, a disc-shaped substrate 2 made of carburized steel (SCM415, chromium molybdenum steel, according to JIS G 4105) was prepared to have a dimension of a 30 mm diameter and a 4 mm thickness, as shown in FIG. 1. A super finishing was made on the upper surface of the substrate 2 to have a surface roughness Ra of 0.04 µm. Thereafter, a hard carbon-based film 3 was coated on the upper surface of the substrate 2 by an ion plating process using carbon ion beam, as shown in FIG. 1. The surface section of the hard carbon-based film 3 was estimated to contain hydrogen in an amount less than 10 at %. As a result, a slidably movable member 1 as shown in FIG. 1 was produced to have a surface roughness Ra of 0.09 µm without being subjected to finishing after formation of the hard carbon-based film 3.

Example 3

A slidably movable member 1 of Example 3 was produced similarly to Example 2 with the exception that lapping was made on the upper surface of the slidably movable member 1 so that the slidably movable member has a surface roughness Ra of 0.03 µm.

Example 4

First, a disc-shaped substrate 2 made of carburized steel (according to JIS SCM415) was prepared to have a dimension of a 30 mm diameter and a 4 mm thickness, as shown in FIG. 1. A super finishing was made on the upper surface of the substrate 2 to have a surface roughness Ra of 0.04 µm. Thereafter, a diamond like carbon (DLC) film or hard carbon-based film 3 was formed on the upper surface of the substrate 2 by a plasma enhanced CVD process using hydrocarbon gas. The surface section of the hard carbon-based film 3 was estimated to contain hydrogen in an amount more than 10 at %. Subsequently, the substrate 2 with the DLC film was put on the substrate holder 24 in the plasma treatment apparatus 21 and subjected to an oxygen plasma treatment to cause the surface section of the hard carbon-based film 3 to contain oxygen under the following conditions: the RF input power was 50 W; the oxygen gas flow rate was 10 cc/min.; and the bias voltage was −100 V. As a result, a slidably movable member 1 as shown in FIG. 1 was produced to have the hard carbon-based film whose the surface section had an oxygen content of about 3.5 at %.

Example 5

The slidably movable member 1 of Example 3 was put on the substrate holder 24 in the plasma treatment apparatus 21 and subjected to an oxygen plasma treatment similar to that in Example 4. The hard carbon-based film 3 was estimated to contain hydrogen in an amount less than 10 at %. As a result, a slidably movable member 1 as shown in FIG. 1 was produced to have the hard carbon-based film whose surface section had an oxygen content of about 3.5 at %.

Example 6

The slidably movable member 1 of Example 1 was put on the substrate holder 24 in the plasma treatment apparatus 21 so that the diamond polycrystal film or hard carbon-based film 3 was subjected to a nitrogen plasma treatment to cause the surface section of the hard carbon-based film 3 to contain nitrogen, under conditions similar to those in Examples 4 and 5 with the exception that the oxygen gas flow rate was replaced with a nitrogen gas flow rate. The hard carbon-based film 3 was estimated to contain hydrogen in an amount less than 10 at %. As a result, a slidably movable member 1 of Example 6 was produced to have the hard carbon-based film 3 whose surface section had a nitrogen content of about 5.7 at %, as shown in FIG. 1.

Comparative Example 1

First, a disc-shaped substrate made of carburized steel (according to JIS SCM415) was prepared to have a dimension of a 30 mm diameter and a 4 mm thickness, as shown in FIG. 1. Grinding was made on the upper surface of the substrate to have a surface roughness Ra of 0.24 μm. Thereafter, the upper surface of the substrate 2 was subjected to a manganese phosphate treatment for forming a manganese phosphate coating. As a result, a slidably movable member of Comparative Example 1 as shown in FIG. 1 was produced.

Comparative Example 2

First, a disc-shaped substrate 2 made of carburized steel (according to JIS SCM415) was prepared to have dimensions of a 30 mm diameter and a 4 mm thickness, as shown in FIG. 1. Thereafter, super finishing was made on the upper surface of the substrate 2 to have a surface roughness Ra of 0.04 μm. As a result, a slidably movable member of Comparative Example 2 like that as shown in FIG. 1 was produced.

Comparative Example 3

The slidably movable member of Comparative Example 2 was subjected to an ion plating process, in which the surface of the slidably movable member was coated with chromium nitride (CrN). As a result, a slidably movable member of Comparative Example 3 as shown in FIG. 1 was produced to have a chromium nitride film having a thickness of 2.0 μm and a surface hardness Hv of 1500.

Comparative Example 4

First, a disc-shaped substrate made of ceramic (silicon nitride) was prepared to have a dimension of a 30 mm diameter and a 4 mm thickness, as shown in FIG. 1. A diamond polycrystal film (synthesized in gas phase) having a thickness of 10.0 μm was deposited on an upper surface of the substrate by a thermal CVD process to form a hard carbon-based film like that as shown in FIG. 1. The hard carbon-based film 3 was estimated to contain hydrogen in an amount less than 10 at %. As a result, a slidably movable member of Comparative Example 4 as shown in FIG. 1 was produced to have a surface roughness Ra of 0.12 μm.

Comparative Example 5

First, a disc-shaped substrate made of carburized steel (according to JIS SCM415) was prepared to have a dimension of a 30 mm diameter and a 4 mm thickness, as shown in FIG. 1. Then, super finishing was made on the upper surface of the substrate to have a surface roughness Ra of 0.04 μm. Thereafter, a diamond like carbon (DLC) film was formed on the upper surface of the substrate by a plasma enhanced CVD process using hydrocarbon gas. The surface section of the hard carbon-based film was estimated to contain hydrogen in an amount more than 10 at %. As a result, a slidably movable member of Comparative Example 5 as shown in FIG. 1 was produced.

Comparative Example 6

First, a disc-shaped substrate made of carburized steel (according to JIS SCM415) was prepared to have a dimension of a 30 mm diameter and a 4 mm thickness, as shown in FIG. 1. Grinding was made on the upper surface of the substrate to have a surface roughness Ra of 0.20 μm. Thereafter, a hard carbon-based film was coated on the upper surface of the substrate by an ion plating process using carbon ion beam. The surface section of the hard carbon-based film was estimated to contain hydrogen in an amount less than 10 at %. As a result, a slidably movable member of Comparative Example 6 as shown in FIG. 1 was produced to have a surface roughness Ra of 0.25 μm.

Comparative Example 7

The slidably movable member of Comparative Example 6 was put on the substrate holder 24 in the plasma treatment apparatus 21 and subjected to a oxygen plasma treatment similar to that in Example 4. The surface section of the hard carbon-based film was estimated to contain hydrogen in an amount less than 10 at %. As a result, a slidably movable member of Comparative Example 7 as shown in FIG. 1 was produced to have the hard carbon-based film whose surface section had an oxygen content of about 40 at %.

The essential points of Examples and Comparative Examples are shown at the upper part of Table 1.

EXPERIMENT

Figure 3:
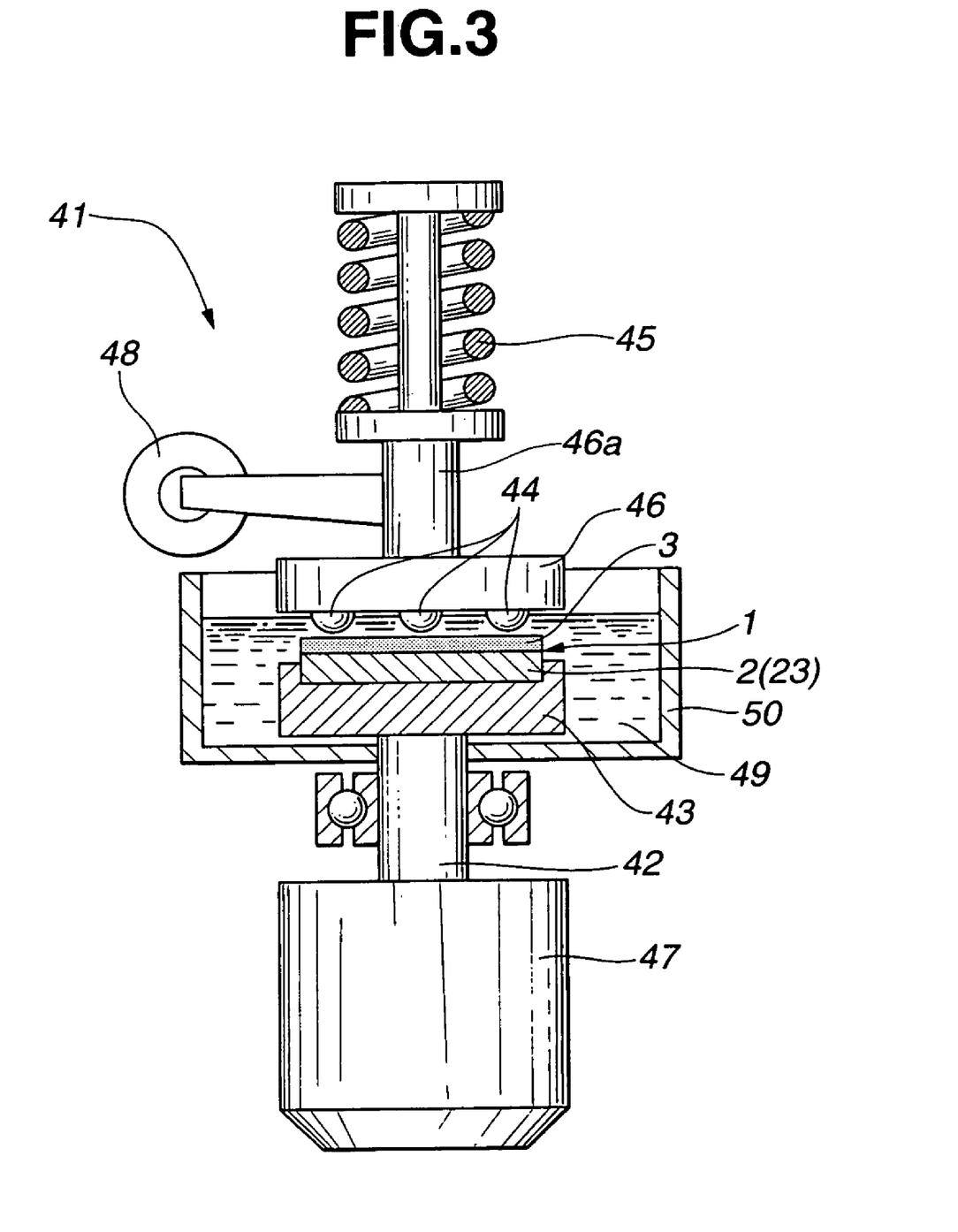
FIG. 3 is an explanatory sectional view of a friction tester for measuring a coefficient of friction of the slidably movable member according to the present invention.

In order to evaluate the performance of the slidably movable members according to the present invention, the coefficient of frictions of the slidably movable members were measured by using a pin-on-disc type friction tester 41 as shown in FIG. 3.

The friction tester 41 included a work table 43 which was rotatably supported through a rotatable shaft 42. Three steel balls 44 were fixedly supported by a ball holder 46, and located above the work table 43. Each steel ball 44 had a diameter of ⅜ inch and formed of a steel (SUJ2, high carbon chromium bearing steel, according to JIS G 4805). A slidably movable member (of Examples and Comparative Examples) was securely mounted, as a test piece, on the work table 43, so that the steel balls 44 were in slidable contact with the slidably movable member 1. The steel balls 44 were pressed onto the slidably movable member 1 at a load of 1.0 kgf by a spring 45, through a spring support 46a connected to the ball holder 46. The rotatable shaft 42 was directly connected to a motor 47 and rotated at a relative sliding speed ranging from 0.01 to 0.1 m/sec. to the steel balls 44. A load cell 48 was connected to the spring support 46a so as to measure a force due to a torque generated in accordance with a friction between the steel balls 44 and the slidably movable member 1. Additionally, an oil bath 50 was provided so that the slidably movable member 1 was able to be dipped in lubricating oil 49. The temperature of the lubricating oil 49 was controlled at about 80° C. by an oil temperature control unit (not shown). The lubricating oil was an engine lubricating oil (5W-30SG) available on the market. From the measured force due to the torque, a coefficient of friction μ was calculated as shown in Table 1. In this experiment, two kinds of friction coefficients μ were measured, in which one friction coefficient μ was measured in the lubricating oil while the other friction coefficient μ was measured without the lubricating oil (or under no lubrication) so that no lubricating oil was supplied in the oil bath 50, under the same conditions in which the load applied to the three balls 44 was 1 kgf; and the relative sliding speed was 0.25 m/sec (250 r.p.m.).

As apparent from the test result shown in Table 1, the hard carbon-base films of Examples have a solid lubricating characteristics, and therefore the slidably movable members of Examples are low in friction coefficient as compared with the slidably movable members of Comparative Example 2 having no hard film and of Comparative Examples 1 and 3 having the hard film having no solid lubricating characteristics, under the condition of no lubrication.

However, under the condition of lubrication using the lubricating oil, the slidably movable member of Comparative Example 5 having the hard film of diamond like carbon having a hydrogen content higher than 10 at % is generally equivalent in friction coefficient to the slidably movable members of Comparative Examples 1 and 2 having no hard film. The friction coefficient is higher than 0.07 and therefore low in friction lowering effect even in the slidably movable member of Comparative Example 4 having the hard film of diamond polycrystal film (or amorphous carbon film) in case that the surface roughness Ra of the slidably movable member is over 0.10 μm.

In contrast, the slidably movable members of Examples 1 to 6 have a friction coefficient of not higher than 0.07. These slidably movable members are provided with the hard films having a hydrogen content lower than 10 at % and/or a specified nitrogen or oxygen content and having a surface roughness Ra of not higher than 0.01 μm. This reveals that these slidably movable members can be effectively lowered in friction loss even in lubricating oil.

Figure 4:
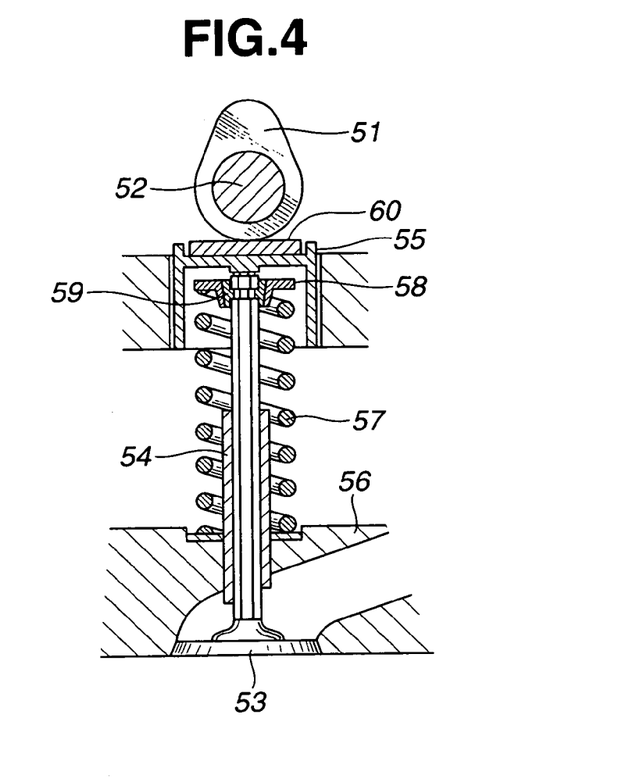
FIG. 4 is a fragmentary explanatory sectional view of an essential part of a valve operating mechanism of an internal combustion engine, in which the slidably movable member according to the present invention is used as an adjusting shim.

Furthermore, a friction loss torque (torque corresponding to a friction loss) was measured for a cam of a camshaft of a valve operating mechanism of an internal combustion engine in case that the slidably movable members of Example 5 and Comparative Examples 1, 2, 3 and 5 was used as an adjusting shim, by using the engine having the valve operating mechanism shown in FIG. 4.

In the valve operating mechanism shown in FIG. 4, the camshaft 52 having cams 51 was driven to rotate through a timing belt by the engine. An engine (intake or exhaust) valve 53 was slidably inserted in a valve guide 54. A valve lifter 55 was disposed at an upper end of the valve 53. A valve spring 57 was disposed between the valve lifter 55 and a cylinder head 56. The upper end section of the valve spring 57 is fixed to a stem section of the valve 53 by using a retainer 58 and a cotter 59. The valve spring 57 functioned to apply load to the valve 53 in a direction in which the valve 53 closes. The adjusting shim 60 was fitted in a depression formed at the top section of the valve lifter 55 and had such a thickness that a clearance of about 0.3 mm was formed between the cam 51 and the adjusting shim 60. Upon rotation of the camshaft 52, the cam 51 rotated and was in slidable contact with the adjusting shim 60 thereby making reciprocating movement of the valve 53.

The camshaft 52 was driven by a motor (not shown) through a torque meter (not shown) installed on an end section of the camshaft to measure a torque corresponding to a friction loss generated between the can 51 and the adjusting shim 60, under the following conditions: A rotational speed of the camshaft 52 was 3000 r.p.m. (corresponding to idling); a maximum load of the valve spring 57 was 50 kgf; an engine lubricating oil temperature was 80° C.; the cam 51 to which the adjusting shim 60 was slidably contacted had been subjected to superfinishing so as to have a surface roughness Ra of 0.05 μm. The result of measurement of the friction loss torque is shown in the form of a bar graph in FIG. 5 in which bars a, b, c, d and e respectively represent Example 5 (1.64 kg-cm), Comparative Example 1 (2.87 kg-cm), Comparative Example 2 (2.40 kg-cm), Comparative Example 3 (2.43 kg-cm) and Comparative Example 5 (2.28 kg-cm).

Figure 5:
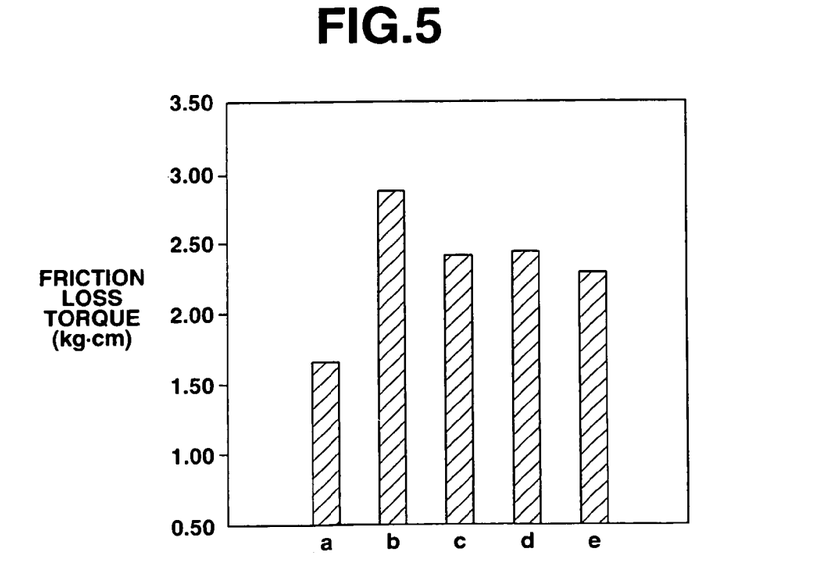
FIG. 5 is a graph showing test results of measurement of a friction loss torque, obtained by using the valve operating mechanism of FIG. 4.

As apparent from FIG. 5, the slidably movable member of Example is low in friction loss torque as compared with that of Comparative Examples even in case having the same surface roughness. This reveals that the slidably movable member according to the present invention is high in friction performance.

The entire contents of Japanese Patent Application P11-102205 (filed Apr. 9, 1999) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A system comprising:
a) a metal or silicon nitride substrate;
b) an oiliness agent; and
c) a hard carbon-based film formed on the substrate, the hard carbon-based film comprising a sufficient number of polar groups to adsorb the oiliness agent to a degree to produce a lowered coefficient of friction;
wherein the hard carbon-based film has a surface roughness, Ra, of not higher than 0.1 μm.

2. A system comprising:
a) a metal or silicon nitride substrate;
b) a hard carbon-based film formed on the substrate, the hard carbon-based film having been applied by a process that produces in a surface of the film an increased concentration of polar groups; and
c) an agent which adsorbs to the surface of the hard carbon-based film as a result of the presence of the polar groups and which thereby decreases the friction coefficient of the surface wherein the hard carbon-based film has a surface roughness, Ra, of not higher than 0.1 μm.

3. A method for making a system which comprises a metal or silicon nitride substrate; a hard carbon-based film formed on the substrate, the hard carbon-based film having been applied by a process that produces in a surface of the film an increased concentration of polar groups; and an agent which adsorbs to the surface of the hard carbon-based film as a result of the presence of the polar groups and which thereby decreases the friction coefficient of the surface wherein the hard carbon-based film has a surface roughness, Ra, of not higher than 0.1 μm, the method comprising:

forming the hard carbon-based film on a surface of a substrate forming part of a slidable member;

producing polar groups on the surface of the hard carbon-base film; and allowing the agent to adsorb to the surface of the hard carbon-based film.

4. A method as claimed in claim 3, wherein the hard carbon-based film has a surface roughness, Ra, of not higher than 0.1 μm.

5. A method as claimed in claim 3, wherein the hard carbon-based film has a coefficient of friction of not higher than 0.07.

6. A method as claimed in claim 3, wherein the one additive is an oiliness agent.

7. A method as claimed in claim 3, wherein the producing the polar groups on the surface of the hard carbon-based film is carried out by a process selected from the group consisting of a process that provides at least one of (a) introducing into the surface of the film at least one of nitrogen and oxygen in an amount ranging from 0.5 to 30 at %; and (b) lowering a content of hydrogen in the surface of the film.

8. A method as claimed in claim 3, wherein the producing the polar groups on the surface of the hard carbon-based film is carried out by a process selected from the group consisting of a carbon ion beam process in which hydrogen plasma is not used at least during formation of the hard carbon-based film, a thermal chemical vapor deposition process which produces a diamond polycrystal, an ion plating process, and a sputtering process.

9. A system comprising:

a first surface which comprises a sliding surface comprising a diamond-like carbon film having a hydrogen content of not more than 10% and polar groups present at the surface of the film;

a second surface which comprises a sliding surface; and a lubricant in contact with the sliding surfaces of the first and second substrates wherein the lubricant comprises a friction modifier.

* * * * *